(12) United States Patent
Katz et al.

(10) Patent No.: US 11,620,158 B2
(45) Date of Patent: Apr. 4, 2023

(54) MULTI-OBJECTIVE SCHEDULING SYSTEM AND METHOD

(71) Applicant: B.G. NEGEV TECHNOLOGIES & APPLICATIONS LTD. AT BEN-GURION UNIVERSITY, Beer-Sheva (IL)

(72) Inventors: Gilad Katz, Tel Aviv (IL); Asaf Shabtai, Hulda (IL); Yoni Birman, Tel Aviv (IL); Ziv Ido, Hahashmonaim (IL)

(73) Assignee: B.G. NEGEV TECHNOLOGIES & APPLICATIONS LTD. AT BEN-GURION UNIVERSITY, Beer-Sheva (IL)

( * ) Notice: Subject to any disclaimer, the term of this patent is extended or adjusted under 35 U.S.C. 154(b) by 178 days.

(21) Appl. No.: 17/148,853

(22) Filed: Jan. 14, 2021

(65) Prior Publication Data
US 2021/0216366 A1    Jul. 15, 2021

Related U.S. Application Data

(60) Provisional application No. 62/961,237, filed on Jan. 15, 2020.

(51) Int. Cl.
| | | |
|---|---|---|
| *G06F 9/46* | (2006.01) | |
| *G06F 9/48* | (2006.01) | |
| *G06F 9/50* | (2006.01) | |
| *G06F 18/214* | (2023.01) | |

(52) U.S. Cl.
CPC ............ *G06F 9/4881* (2013.01); *G06F 9/485* (2013.01); *G06F 9/5038* (2013.01); *G06F 18/214* (2023.01)

(58) Field of Classification Search
CPC ....... G06F 9/4881; G06F 9/485; G06F 9/5038
See application file for complete search history.

(56) References Cited

U.S. PATENT DOCUMENTS

| | | | | |
|---|---|---|---|---|
| 2016/0019089 | A1* | 1/2016 | Jeong | G06F 9/5027 718/102 |
| 2021/0216366 | A1* | 7/2021 | Katz | G06K 9/6256 |

OTHER PUBLICATIONS

David J. Bruemmer, Julie L. Marble, Donald D. Dudenhoeffer, Matthew O. Anderson, Mark D. McKay ; Mixed-Initiative Control for Remote Characterization of Hazardous Environments.*

\* cited by examiner

*Primary Examiner* — Camquy Truong
(74) *Attorney, Agent, or Firm* — Nixon & Vanderhye PC

(57) ABSTRACT

A master-slave scheduling system, comprising (a) a master DRL unit comprising: (i) a queue containing a plurality of item-representations; (ii) a master policy module configured to select a single item-representation from the queue and submit to the slave unit; (iii) a master DRL agent configured to (a) train the master policy module; and (b) receive an updated item-representation from the slave unit, and update the queue;
(b) The slave DRL unit comprising: (i) a slave policy module receiving a single item-representation, selecting a single task entry and submitting to a slave environment for performance; (ii) a slave DRL agent configured to: (a) train the slave policy module; (b) receive an item-representation from the master DRL unit, and submit to the slave policy module; (c) receive an updated item-representation from the slave's environment, and submit the same to the master DRL unit; and (iii) the slave DRL agent.

8 Claims, 10 Drawing Sheets

| Exp. # | Reward Setup | | | | Accuracy (%) | Mean Time (sec) |
|---|---|---|---|---|---|---|
| | TP | TN | FP | FN | | |
| 1 | C'(t) | C'(t) | -C'(t) | -C'(t) | 96.867 | 48.61 |
| 2 | C'(t) | C'(t) | -10C'(t) | -10C'(t) | 96.801 | 48.37 |
| 3 | 1 | 1 | -C'(t) | -C'(t) | 96.212 | 10.53 |
| 4 | 10 | 10 | -C'(t) | -C'(t) | 95.424 | 3.68 |
| 5 | 100 | 100 | -C'(t) | -C'(t) | 91.220 | 0.73 |

|  | $v_1$ | $v_2$ | ... | $v_{k-1}$ | $v_k$ | $d$ |
|---|---|---|---|---|---|---|
| $Item_1$ | -1 | 0.64 | ... | 0.45 | -1 | 0 |
| $Item_2$ | 0.45 | -1 | ... | -1 | 0.2 | 1 |
| ⋮ | | | | | | |
| $Item_{n-1}$ | 0.93 | -1 | ... | -1 | -1 | 1 |
| $Item_n$ | -1 | -1 | ... | -1 | -1 | 0 |

Fig. 3

| Exp. # | Reward Setup | | | | Accuracy (%) | Mean Time (sec) |
|---|---|---|---|---|---|---|
| | TP | TN | FP | FN | | |
| 1 | $C'(t)$ | $C'(t)$ | $-C'(t)$ | $-C'(t)$ | 96.867 | 48.61 |
| 2 | $C'(t)$ | $C'(t)$ | $-10C'(t)$ | $-10C'(t)$ | 96.801 | 48.37 |
| 3 | 1 | 1 | $-C'(t)$ | $-C'(t)$ | 96.212 | 10.53 |
| 4 | 10 | 10 | $-C'(t)$ | $-C'(t)$ | 95.424 | 3.68 |
| 5 | 100 | 100 | $-C'(t)$ | $-C'(t)$ | 91.220 | 0.73 |

Fig. 6

| Queue Size | # of Epochs | Training Time (Hours) | | Avg. Completion Time (Seconds) | |
|---|---|---|---|---|---|
| | | MERLIN $T=10$ | MERLIN $T=20/30$ | MERLIN $T=10$ | MERLIN $T=20/30$ |
| 20 | 10 | 5 | 19 | 34.46 | 39.62 |
| | 20 | 12 | 42 | 31.48 | 36.64 |
| | 34 | 22 | 73 | 28.74 | 30.24 |
| | 40 | - | 102 | - | 30.04 |
| | 58 | - | 141 | - | 29.86 |
| 30 | 10 | 5 | 24 | 49.17 | 65.19 |
| | 20 | 12 | 51 | 44.91 | 61.47 |
| | 34 | 22 | 95 | 41.01 | 53.88 |

Fig. 9

MULTI-OBJECTIVE SCHEDULING SYSTEM AND METHOD

This application claims priority to U.S. Application No. 62/961,237 filed Jan. 15, 2020, the entire contents of which is hereby incorporated by reference.

FIELD OF THE INVENTION

The invention relates in general to the field of managing and scheduling tasks, more particularly, to a hierarchical system and method for task scheduling.

BACKGROUND OF THE INVENTION

Scheduling algorithms allocate resources to tasks over a given time to optimize one or more evaluation metrics, such as throughput, average waiting time in a queue, etc. Scheduling is crucial in multiple domains, such as in the manufacturing and service industries, medicine, malware detection, etc. The task scheduling may address resources of various forms, such as: memory and CPU in a computing environment, machines in a workshop, runways at an airport, allocation of medical tests and doctors to patients, etc. While simple scheduling tasks can be easily solved using existing heuristic approaches, the environment of multi-objective task scheduling (MOTS) is more challenging. The added difficulty stems from the necessity to balance multiple goals and sometimes reconcile contradictory metrics.

The scheduling algorithm which is utilized has a significant impact on the productivity of a process. The selection and implementation of a scheduling algorithm should consider different prerequisites and requirements of the environment. Some of the key factors that affect the scheduling algorithm selection include whether the scheduling policy is defined before or during the execution and the ability to interrupt (i.e., pause) a process and replace the currently executed task. The latter approach, which enables rotation between uncompleted tasks, is called preemption.

The field of multi-objective task scheduling (MOTS) deals with the optimization of task scheduling, where the variety of tasks can have multiple, sometimes contradicting constraints. A more challenging extension within this field is when each task by itself reflects a multi-objective optimization problem. While deep reinforcement learning (DRL) has been successfully applied to complex sequential problems, its application to the MOTS domain has faced two challenges. First, the DRL algorithm is incapable of ensuring that each item is processed identically regardless of its position in the queue. Second, when applied to massive queues, DRL has resulted in large neural architectures and long training times.

In recent years, Deep Reinforcement Learning (DRL)-based solutions have emerged as a promising alternative to existing heuristic scheduling solutions, often achieving state-of-the-art results. DRL algorithms have significant advantages compared to other scheduling methods, particularly in cases involving uncertainties. First and foremost, they enable the formulation of sophisticated strategies by making short-term sacrifices to gain larger rewards later on, in contrast to similar "greedy" algorithms that try to maximize immediate results. Secondly, the DRL approach can efficiently explore massive action and state spaces, thus enabling novel and useful policies for complex scenarios. Thirdly, when a DRL's reward function is correctly defined, the DRL algorithm very likely develops a strategy that achieves the desired goals.

While highly effective, the DRL-based approach still has two significant shortcomings when applied to MOTS problems. The first shortcoming is when a necessity arises to integrate multiple and often conflicting objectives into a single reward function. This situation arises when the processing of each task is not fixed but instead constitutes a multi-objective optimization problem of its own. Such a procedure requires addressing a multi-optimization issue both for individual tasks and the entire queue, resulting in a complex and difficult-to-define expression. Moreover, each said optimization goal is likely to include its own and separate reward frequency and scale, thus contributing to the difficulty of defining the reward function.

The second challenge associated with applying a DRL-based solution to MOTS problems is the complexity of ensuring that samples are processed identically regardless of the queue state. This complexity evolves from the necessity to define a single reward function that models all constraints and priorities. The integration of the bounds and constraints into a complex function is far from being trivial. For example, a DRL-based system tasked with detecting malware in a queue of incoming files has two conflicting goals: (a) a high detection rate (accuracy); and (b) a low average processing time. When this system becomes backlogged over time (i.e., the average processing times rise quickly), the DRL-agent typically begins a less extensive analysis of files to reduce processing times, resulting in a compromise in the detection rate. A scenario where an item is processed differently based on the queue's current state is unacceptable in multiple domains, including medical testing and safety maintenance checks.

A more general shortcoming of applying DRL to scheduling problems—one shared by all artificial neural network (ANN) architectures and other types of machine learning (ML) algorithms—is the requirement for using a fixed size of the input to train the model. This requirement means that scheduling policies developed by such algorithms are incapable of effectively operating on queues larger than those on which they were trained. This limitation can potentially lead to significantly sub-optimal solutions, as the scheduling algorithm can process only a part of the queue at each given time. To (partially) address this problem, DRL-based scheduling algorithms are often trained on very large queues, possibly larger than eventually applied. While this approach improves the algorithm's performance, it also requires considerably larger architectures, training data, and training time.

It is an object of the present invention to provide a novel structure that eliminates all the above problems.

Another object of the invention is to provide a multi-objective task scheduling (MOTS) structure that handles the same each item without compromising accuracy, even when a necessity arises to increase throughput beyond the expected.

It is still another object of the invention to provide a multi-objective task scheduling (MOTS) structure that can be easily upgraded to operate on queue sizes larger than those trained on, without sacrificing accuracy or efficiency.

Other objects and advantages will become apparent as the description proceeds.

SUMMARY OF THE INVENTION

The invention relates to a master-slave scheduling system, comprising a master DRL unit and a slave DRL unit, wherein:
(a) the master DRL unit comprising: (i) a queue which is configured to contain a plurality of item-representations, each item-representation comprising a plurality of task-entries, each task entry indicating a status of a task for performance at the slave DRL unit; (ii) a master policy module in a form of a neural network, the master policy module being pre-trained by a master DRL agent and is configured to select a single item-representation from the entire queue and submit the same to the slave unit; (iii) the master DRL agent which is configured to (a) train the master policy module; and (b) timely receive an updated item-representation from the slave unit, and update the queue accordingly;
(b) The slave DRL unit comprising: (i) a slave policy module in a form of a neural network which is configured to receive a single item-representation, and based on a plurality of the task entries included in the received item representation, select a single task entry and submit the selected task entry to a slave environment for performance; (ii) a slave DRL agent which is configured to: (a) train the slave policy module; (b) receive an item-representation from the master DRL unit, and submit the same to the slave policy module; (c) receive an updated item-representation from the slave's environment, and submit the updated item representation to the master DRL unit; and (iii) the slave DRL agent which is configured to receive a task, perform the task, and return a status of the performed task.

In an embodiment of the invention, the updated item-representation reflects a new state of the slave's environment.

In an embodiment of the invention, the slave DRL unit serves as an environment of the master DRL unit.

In an embodiment of the invention, the master-slave scheduling system is configured to handle a queue having a size Q larger by n orders of magnitude than q, where q is the size of a main queue on which the master unit was trained on, the system comprising: (i) the main queue of the master DRL unit; (ii) an additional stage for each said order of magnitude n beyond an order of 0, where each additional stage in turn comprising $q^n$ sub-queues; (iii) wherein during operation, and starting from a highest-order stage, the master policy module is configured to: (a) starting from a highest order stage, apply its operation sequentially on all sub-queues in the stage to select a single item from each sub-queue and to transfer the selected item to a respective sub-queue in a lower-order stage; (b) continuing sequentially in all other lower order stages by repeating step (a), until q items are selected and fed into the main queue of the master DRL unit.

In an embodiment of the invention, the system is also configured to: (i) initially train the policy module of the slave's DRL unit; upon completion of the training of the slave's DRL unit, freeze the slave DRL unit; and (ii) during said freeze of the slave's DRL unit, train the policy module of the master unit, while the slave's DRL unit is kept in a fixed state.

The invention also relates to a master-slave scheduling method, comprising the steps of: (a) providing a master DRL unit and a slave DRL unit, each of said units comprising its own DRL agent, a policy module in a form of neural network, reward function and constraints, and an environment, wherein said slave DRL unit serves as the environment of said master DRL unit; (b) providing a queue at said master DRL unit, and configuring said queue to contain a plurality of item-representations, each item-representation comprising a plurality of task-entries, each task entry indicating a status of a task for performance at said slave DRL unit; (c) configuring the master's policy module to, each time select a single item representation from said queue, and submit the same to said slave's policy module at said slave's DRL unit; (d) configuring the slave's policy module to select a single task entry from each item representation that it receives, and submit the task entry to said slave's environment for performance; (e) configuring said slave's DRL agent to: (i) receive an item-representation from said master DRL unit, and submit the same to said slave's policy module; (ii) receive an updated item-representation from the slave's environment, and submit the updated item representation to said master DRL unit; (f) based on said slave's reward function and constraints, activating said slave's DRL agent to train said slave policy module; (g) while keeping said slave's DRL unit in a fixed state, and based on said master's reward function and constraints, activating said master DRL agent to train said master policy module; and a. receiving new item representations into the queue, and operating the scheduling method in an operational mode.

In an embodiment of the invention, the updated item-representation reflects a new state of the slave's environment.

In an embodiment of the invention, the scheduling method is adapted to handle a queue having a size Q larger by n orders of magnitude than q, where q is the size of a main queue on which the master DRL unit was trained on, the method comprising: (a) providing said main queue of the master DRL unit; (b) providing an additional stage for each said order of magnitude n beyond an order of 0, where each additional stage in turn comprising $q^n$ sub-queues, each sub-queue having a size of q; (c) during operation, and starting from a highest-order stage, activating said master policy module to: (i) starting from a highest order stage, apply its operation sequentially on all sub-queues in this stage to select a single item from each sub-queue and to transfer the selected item to a sub-queue in a lower-order stage; (ii) continuing sequentially the selections in all remaining lower order stages by repeating step (i), until q selected items are fed into said main queue of the master DRL unit; and (d) continuing the item-representation selection from said main queue of the mater DRL unit, and submitting the selected item representation to the policy module of said slave's DRL unit.

BRIEF DESCRIPTION OF THE DRAWINGS

In the drawings:

FIG. 3 shows an exemplary structure of a queue, according to an embodiment of the invention;

FIG. 4 illustrates in a schematic block diagram form how the master-slave system of the present invention can handle queues having a size of several orders larger than the queue size on which the system has been trained on;

FIG. 6 is a table indicating five reward exemplary setups;

FIG. 9 is a table showing a comparison of the training time (in hours) and the average completion time for a file in a queue (in seconds) comparing between the architecture of the invention (T=10) and two larger architectures trained on T=20/30 respectively.

DETAILED DESCRIPTION OF PREFERRED EMBODIMENTS

The DRL algorithm is a strategic tool for solving a problem. During operation, the DRL algorithm can sacrifice a short-term cost given a final goal that in the long-run minimizes the cost for reaching the problem's solution. This paradigm contrasts with a large majority of supervised learning algorithms that determine and apply a sequence of actions to reach a goal, where each action provides the highest immediate reward (i.e., lowest cost).

Figure 1:
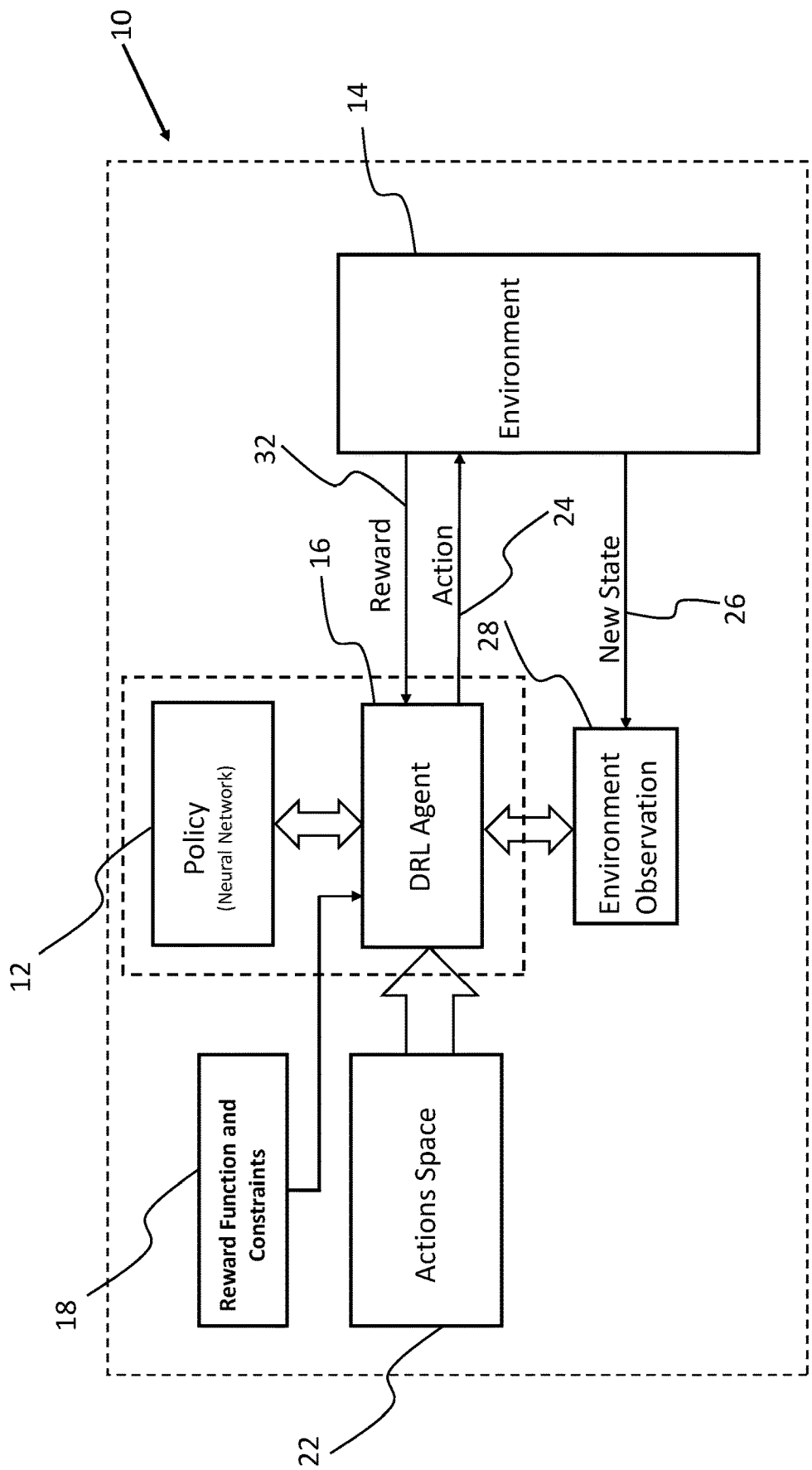
FIG. 1 illustrates in a block diagram form a basic structure of a prior art DRL system.

FIG. 1. Illustrates a basic structure of a typical (prior art) DRL system 10, in a block diagram form. Before the normal operation, the DRL system 20 goes through a training stage to create a policy 12, and only then, the system transfers to an operational mode. Environment 14, which is embodied by a set of vectors, represents the "problem" that the system is targeted to solve. The solution to the problem is a specific combination of values of the environment's set of vectors. For example, the environment may represent a "field" of chess (or another) game, or in an example more similar to the subject of the present invention, the current availability of resources in a medical testing facility. System 10 also includes, as a core component, a DRL agent 16. DRL agent 16 receives a first input from a reward function and constraints 18, and a second input of the entire available actions space 22. The reward function and constraints 18 reflect various limitations, constraints, and availabilities of resources within environment 14. For example, in a game case, the reward function and constraints 18 represent the rules of the game and the limitations applied to each "role-holder" in the game. In a case of a medical testing facility that employs multiple types of tests to examine a disease, the reward function and constraints may include, among others, the availabilities and capabilities, respectively, of resources and their limitations. DRL agent 16, based on the actions space 22 and the policy 12, selects and issues a specific action 24, which is conveyed to the environment 14. Each action 24 modifies the environment in an object to reach a final goal (i.e., the solution to the problem). Following each action 24, the environment is modified, and a new state signal 26, which reflects the updated environment 14 (or only the update itself), is conveyed to environment observation unit 28, which in turn reflects the updated state of the environment to the DRL agent 16. Then, based on the updated state of environment 14 and policy 12, the DRL agent 16 issues a new action 24 (selected from the actions space) with a strategic view to reduce the total costs leading to the final goal. This procedure, which is controlled by the DRL agent 16, is repeated many times until the final goal at environment 14 is reached. In addition, a reward 32 indicating the effectiveness of the current action may be provided. Reward 32 is another feedback that may be issued following each action 24, upon completion of several actions, or only when the final goal is reached. The reward 32 may be positive, negative (i.e., it may reflect a cost), or a combination of both. By issuing a sequence of individual actions 24, and based on policy 12, environment 14 finally arrives at the final goal in a strategic manner that optimizes the long-run cost for reaching the goal.

Policy 12 is typically a neural network whose hyperparameters are fine-tuned during a training stage. During the training, and beginning with a basic (minimal) policy 12, the system is activated in the manner as described above, by sequentially presenting to environment 14 various actions 24 from the actions space 22. During the training stage, the main interest of the DRL agent 16 is to shape policy 12 while giving lower priority to reaching the final goal (at environment 14) in an optimized manner. Following each action 24, agent 16 observes the effect and effectiveness of this action, based on the new state signal (and optionally the reward), returned from environment 14. Agent 16 utilizes this effect observation of each action to update and expand the policy (neural network) 12. This procedure repeats many times during the training with different actions from the actions space until convergence of policy 12 is obtained (convergence means that each additional update to the policy provides a negligible improvement to the policy). When convergence of the neural network (policy) is obtained, the training stage is terminated, and the DRL system is ready for regular operation.

While the DRL scheme of FIG. 1 has been successfully applied to complicated sequential problems, its application to a multi-objective task scheduling (MOTS) domain, i.e., a scheme designed to schedule items in a queue, has been found impractical for two main reasons. First, the DRL scheme of FIG. 1 cannot guarantee that each item is processed identically, regardless of its position in the queue. Second, the single DRL agent of FIG. 1 is problematic in dealing with large queues, as it incapable of dealing with a queue larger in size than the one on which it was trained. To somewhat ease this problem, the single-agent scheme of FIG. 1 is sometimes trained on very large queues that are expected to satisfy the requirements statistically. This tendency results in an extremely large neural architecture that requires a very long training time.

The invention provides a master-slave DRL structure for handling multi-objective scheduling, adapted for varying queue sizes. For the sake of clarity and better explanation, the following description relates to the adaptation of the structure to a queue within a medical testing facility. In a medical testing facility, patients arrive and enter into a queue. It is not known in advance how many tests will be required to diagnose the patient. Based on each test result, the scheduling system assigns a next test to perform (of either the same patient or another). Upon completion of all the tests assigned for all the patients, the goal is achieved. The object is to complete all the tests most efficiently, for example, by reducing the average time patients spend in the queue. During the operation, the list of tests that are assigned to a patient may be modified.

Also, a patient may be removed from the queue in one of the following cases: (a) upon completion of all the tests assigned to that patient; or (b) when a conclusion is reached for the patient, following completion of a portion of the tests assigned to him.

Figure 2:
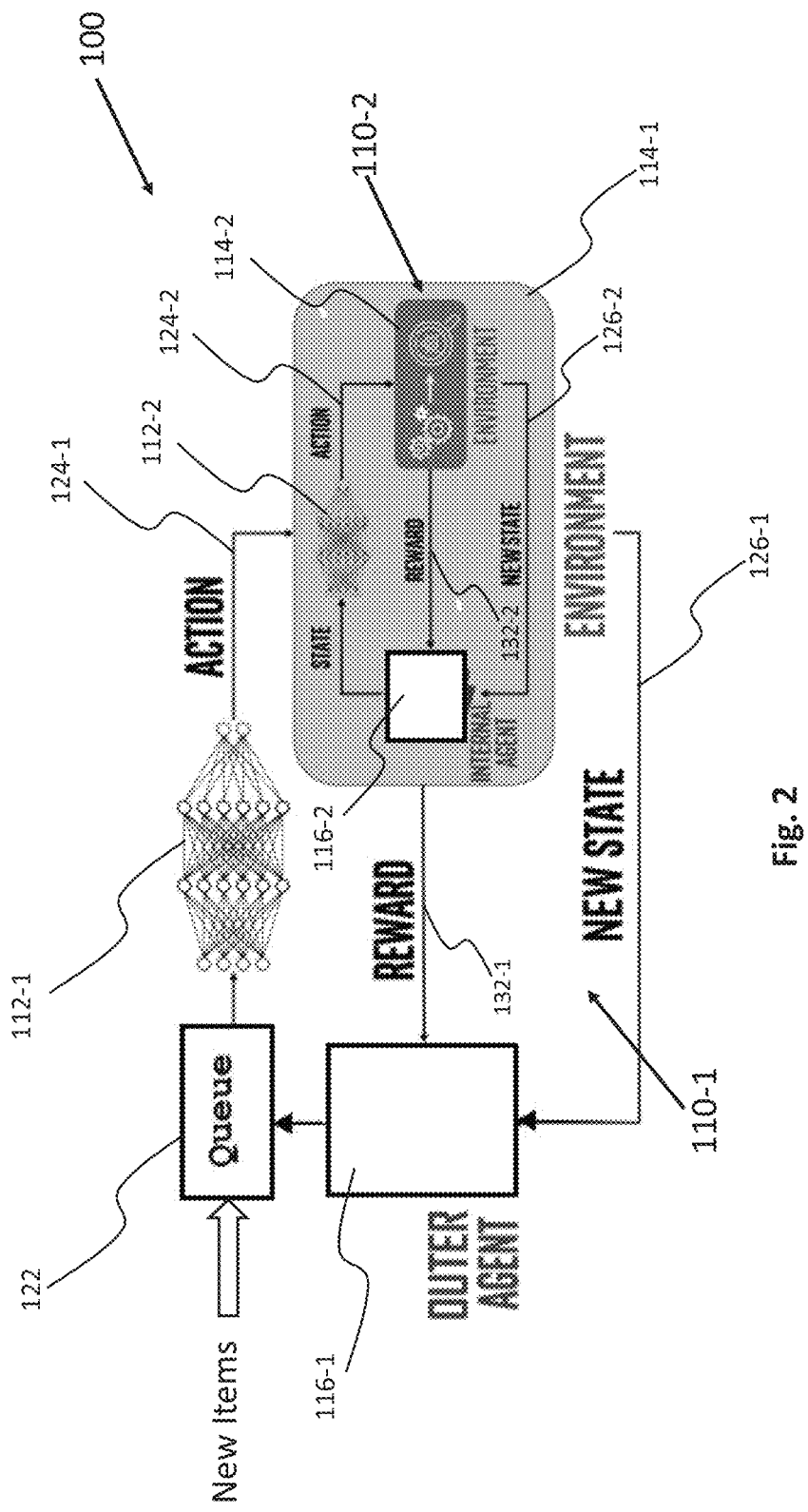
FIG. 2 illustrates in a block diagram form a basic structure of the system of the invention, according to one embodiment.

FIG. 2 illustrates a multi-objective master-slave DRL scheduling system 100 according to an embodiment of the present invention in a block diagram. System 100 includes, in essence, two DRL units, an outer (master) DRL unit 110-1 and an inner (slave) DRL unit 110-2, each of the units is similar in structure to the single DRL unit of FIG. 1. Each component in FIG. 2 having a similar reference to a corresponding component in FIG. 1 serves a similar functionality, respectively. The entire inner unit 110-2 serves as the environment 114-1 of the outer unit 110-1. Therefore, each of the two DRL units has a DRL agent (116-1 and 116-2, respectively), and a policy in the form of a neural network (112-1 and 112-2, respectively), and additional components, as shown.

The functionalities of the entire system 100 are divided between the two DRL units 110-1 and 110-2, as follows:
(a) the outer (master) unit 110-1 manages the queue 122; and
(b) the internal (slave) unit 110-2 manages in each instance only a single item which is submitted to it as a new action by the master unit 110-1.

Queue 122 is, in fact, the actions space 22 of FIG. 1. The queue includes a plurality of items (in some cases, many), each being represented by a vector.

Figure 3:
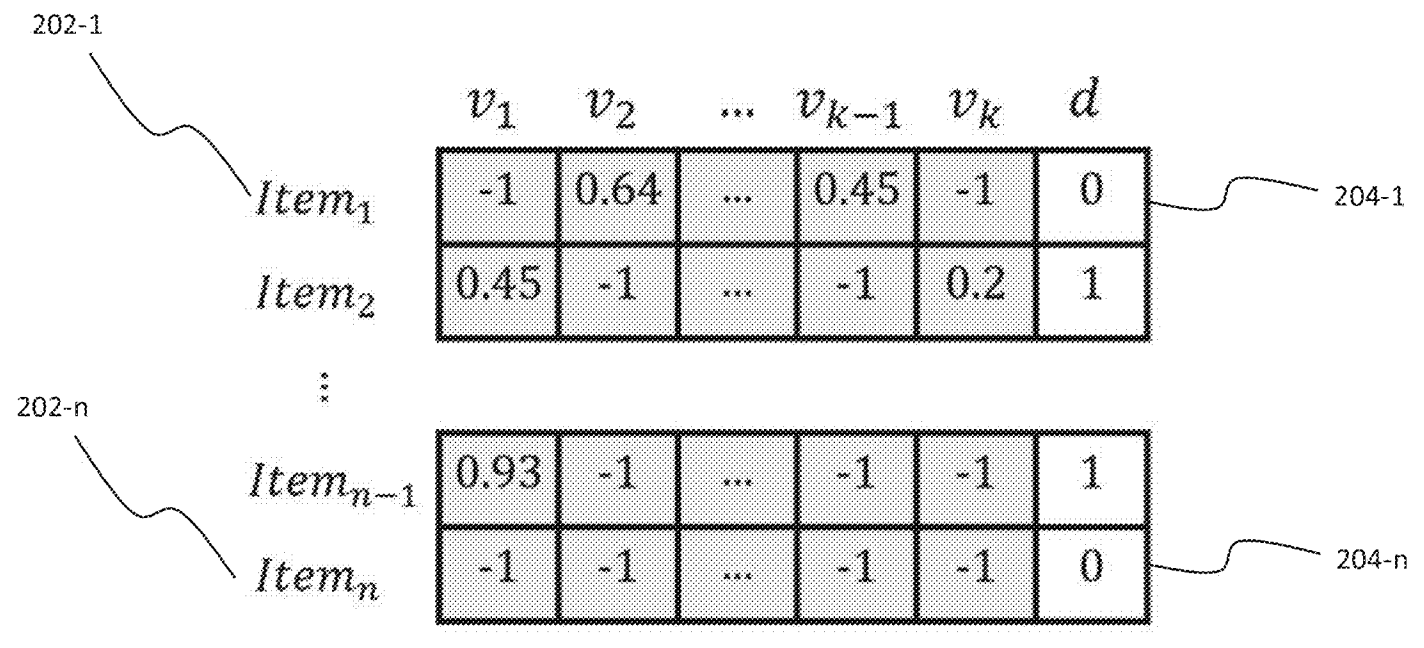

FIG. 3 shows an exemplary structure of queue 122. The queue at the master DRL unit 110-1 contains a plurality of items 202-1 to 202-n. In this example, each item is represented by a vector 204-1 to 204-n, respectively, which in turn includes a plurality of entries $v_1$-$v_k$. For example, in a case of patients visiting a medical testing facility, items 202-1 to 202-n represent the plurality of patients. Each Entry $v_1$-$v_k$ in a vector 204 represents a test value. The additional entry d indicates whether a conclusion has been reached for the respective patient. A value d=0 indicates that no conclusion has been yet reached for the patient. A value d=1 indicates that a conclusion has been reached for the patient, and this patient is essentially out of the queue. Initially, for each item 202-1 to 202-n in the queue, all the values are assigned a (−1) value, namely that the respective test has not been performed yet. When a specific test is completed within the slave unit 110-2, the respective test entry $v_i$ receives a value between 0.00 and 0.99. For example, for items the value (−1) for $v_i$ indicates that the respective test has not been yet performed. The value 0.64 for $v_2$ indicates that the respective test has been performed and received a value of 0.64.

The entire queue 122 is continuously introduced to the neural network (policy) 112-1, which in turn selects each relevant time another queue item 202i, which is then submitted as action 124-1 to the "environment" of the master unit 110-1, namely to the slave DRL unit 110-2. The DRL agent 116-1 is designed to update the queue 122 each time a new state, namely an updated queue item 202, is returned from the slave unit 110-2. The reward 132-1, which is issued by the slave unit 110-2 is conveyed to the DRL agent 116-1 of the master unit: (a) upon completion (by the slave unit 110-2) of each action; (b) upon completion of several actions; (c) at or upon completion of all the items in queue 122. The reward, which is a feedback from the slave unit 110-2 to the master unit 110-1 may be used by the DRL agent as a landmark during the system's operation and may indicate the rate of success or efficiency of the process.

The slave DRL unit 110-2 handles at each instant only a single item 202 conveyed to it from the master DRL unit 110-1. In similarity to the master DRL unit 110-1, the slave DRL unit 110-2 has its own slave DRL-agent 116-2, its own slave policy (neural network) 112-2, and its own slave environment 114-2. For example, and again concerning the case of a medical testing facility, when the slave DRL agent receives an item (action) 124-1 from the master DRL unit 110-1, it inspects the vector 202-1, and based on its policy 112-2 and the content of the vector, it decides on one test to perform on the item. When the respective test is completed, the slave unit fills the test result within the item vector to form an updated vector, and returns the updated vector as a new state to the DRL agent 116-1 of the master DRL unit 110-1. The update may include an indication that additional tests are required for this specific patient (d=0), or a "conclusion indication" (d=1) within the vector, which means that the patient does not need additional tests. Based on the new state, the master DRL unit returns the item to queue 122, and possibly ignores further processing if d=1 (meaning removing it from the queue). Based on the updated queue 122, the master DRL selects an additional item from the queue (based on policy 112-1), and again sends it to the slave DRL unit 110-1. The process repeats until the completion of all the items in the queue.

It should be noted that while the slave unit transfers an item (in this case, a patient) to perform a respective test, it becomes ready to receive another item, which is also sent to test performance. Several or many tests may be performed simultaneously, and upon completion of each test, an updated vector is prepared for the relevant item and returned to the master unit 110-1.

As shown, the master-slave scheduling system 100 includes two DRL units 100-1 and 110-2, respectively. Each of the two units is preferably trained separately (as training them together is much more complicated). Preferably, the slave unit 110-2 is trained first to construct its policy (neural network) 112-2. Only upon completion of the policy of the slave unit, the master unit is trained to construct its policy (neural network) 112-1. When both units 110-1 and 1002-2 are trained, system 100 is ready for operational use.

Figure 10:
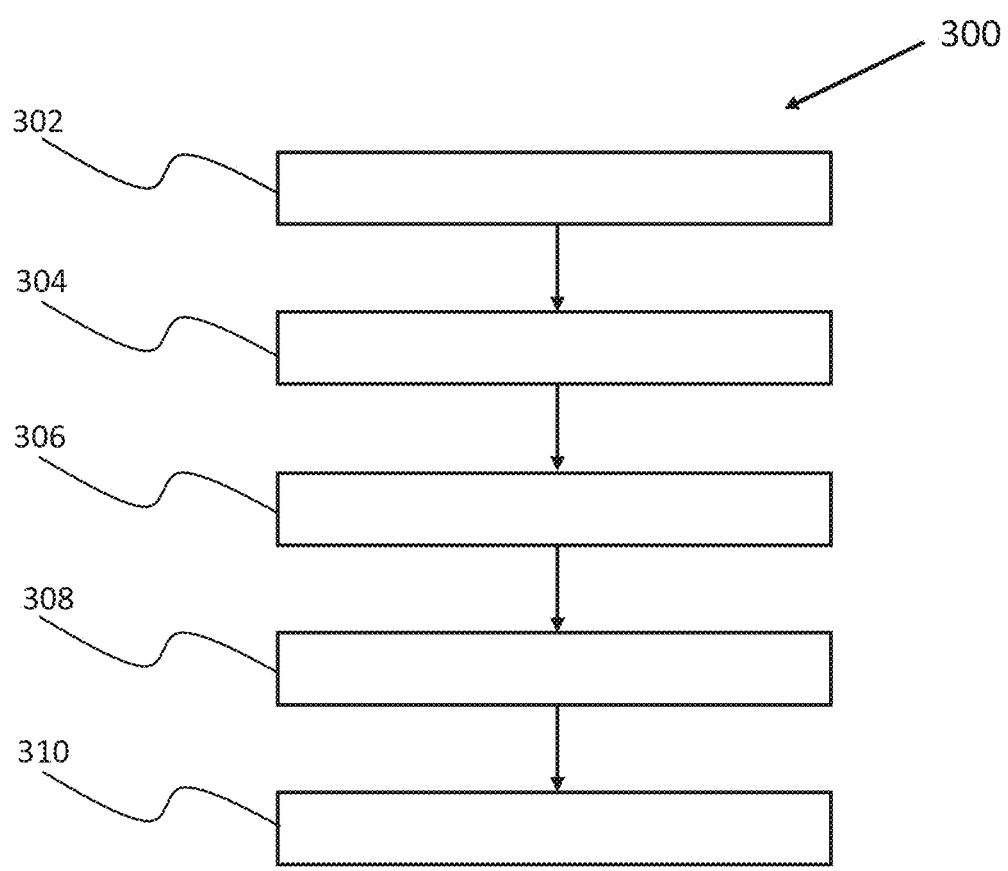
FIG. 10 illustrates in a flow diagram form a general process for preparing a master-slave system, according to an embodiment of the invention.

FIG. 10 illustrates in a flow diagram form a general process 300 for the preparation of the master-slave system 100, according to an embodiment of the invention. In step 302, a reward function and constraints are prepared for each of the master and slave units 110-1 and 110-2, respectively. In step 304, the DRL agent 116-2 of the slave unit is activated to prepare the policy (neural network) 112-2 of the slave unit, using the reward function and definitions that relate to the slave unit (the entire master unit 110-1 remains "frozen" during the entire step 304). When a convergence of the policy 112-2 is reached in step 304, the entire slave unit 110-2 is frozen (step 306). In step 308, the DRL agent 116-1 of the master unit is activated to prepare the policy (neural network) 112-1 of the slave unit, using the reward function and definitions that relate to the master unit (the entire slave unit 110-2 remains frozen during the entire step 308). When a convergence of policy 112-1 is reached, the system transfers to regular operation in step 310.

As noted, a typical single-stage DRL scheduling system suffers from a significant drawback evolving from the queue size that can be used. When dealing with a large queue, a single-stage DRL system must be trained to the maximal expected size of the queue to be effective, even if the average queue size used is much smaller. A DRL system's training to a large size queue results in a huge-size neural network and consumes a very significant training and computer resources duration. As will be shown, the master-slave DRL system of the present invention overcomes this drawback, thanks to the separation between the different tasks assigned to each of the master and slave units, respectively.

Figure 4:
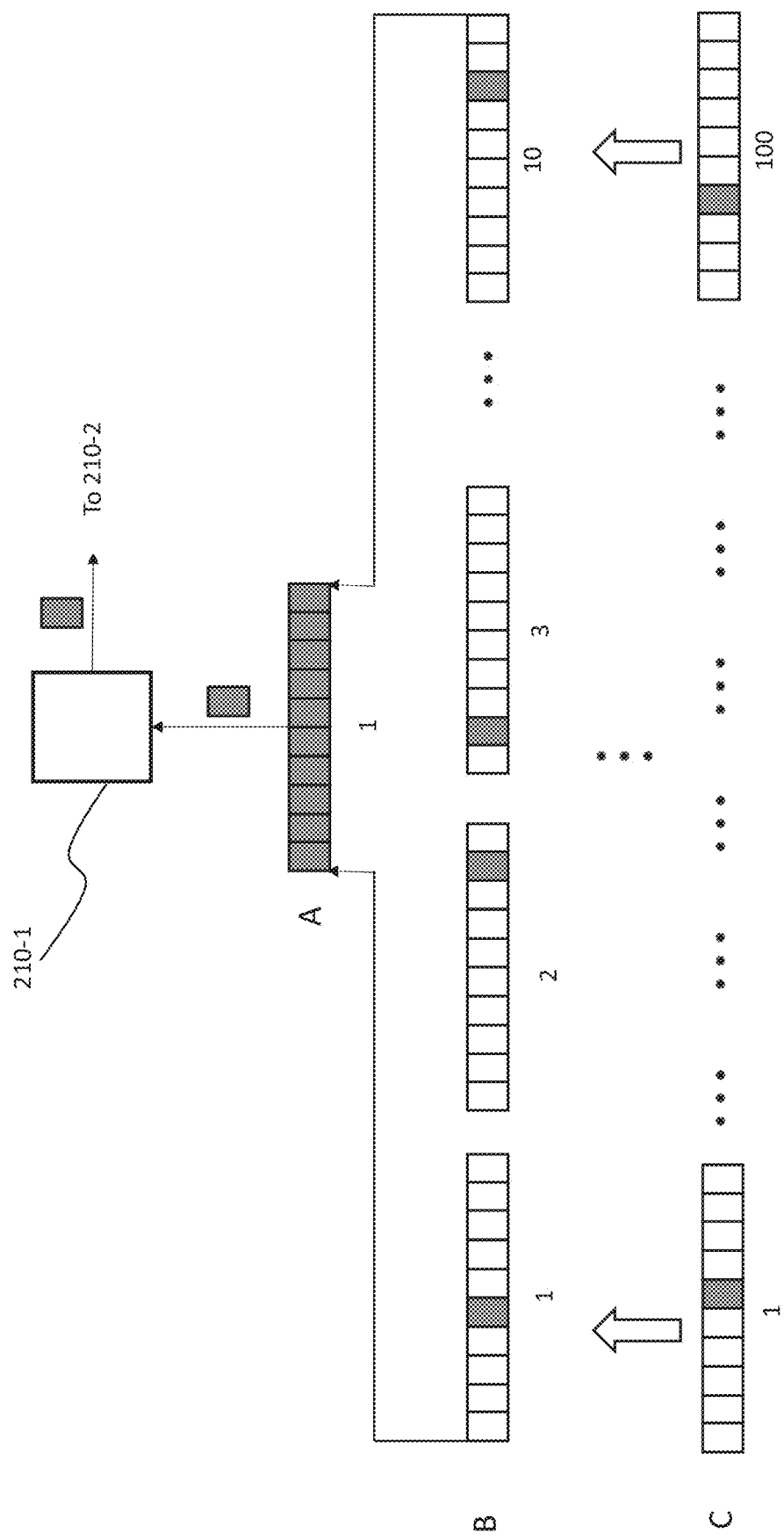

FIG. 4 illustrates in a schematic block diagram form how the master-slave system of the present invention can handle queues having a size of several orders of magnitude larger than the queue size on which the system has been trained on. In this non-limiting example, the DRL master unit 210-1 was trained to operate with a queue size A of 10 items. The queue size, however, contains 1000 items. The 1000 items are included within Queue C, which is in turn divided into 100 sub-queues of 10 items each. Queue B includes 100 items, divided into 10 sub-queues of 10 items each. Therefore, in the first stage, the master unit 210-1 operates separately with each of the 100 sub-queues of queue C, selecting one item from each of the queues C1 to C100, and filling the 100 selected items within sub-queues B1-B10. In the next step, the DRL master unit "scans" each of the 10 sub-queues B1-B10, again selecting one item from each and filling the single 10-item queue A. Finally, the DRL master unit 210-1 scans the queue μl and selects a single item, which is forwarded to the slave unit 210-2 (not shown). In such a manner, the DRL unit, which is trained to operate with a queue of 10 items, can operate with a queue of 1000 items or any larger number of items. A DRL system's training time on a queue size of 10 items is several orders of magnitude simpler than an operation with a queue size of 1000 items. The neural network complication and size is also significantly reduced. The repeated operations on queue sizes of 10 are almost immediate and in several orders of magnitude simpler than the operation on a queue size of 1000. The queue sizes were given in here for demonstration only, and they should not limit the invention to any queue size.

Further Discussion and Experiments

Scheduling algorithms allocate resources to tasks over a given time to optimize one or more evaluation metrics, such as throughput, average waiting time in the queue). The resources addressed by task scheduling can take on multiple forms: memory and CPU in a computing environment, machines in a workshop, runways at an airport, etc. Scheduling is crucial in multiple domains, including the manufacturing and service industries, medicine, and even malware detection. While simple scheduling tasks can be easily solved using existing heuristic approaches, multi-objective task scheduling (MOTS) problems are more challenging. The added difficulty stems not only from the necessity to balance multiple goals but also from the necessity sometimes to reconcile contradictory metrics.

In recent years, deep reinforcement learning (DRL)-based solutions have emerged as a promising alternative to existing heuristic scheduling solutions, often achieving state-of-the-art results. DRL algorithms have some significant strengths compared to other types of scheduling methods, particularly in cases that involve uncertainty. First and foremost, they enable the formulation of sophisticated strategies, including those in which they make short-term sacrifices to reap larger rewards later on. Secondly, DRL algorithms can efficiently explore large state and action spaces, thus enabling them to develop novel and effective policies for complex scenarios. Thirdly, when the reward function (i.e., rewards and punishments for various actions and outcomes) is defined correctly, the DRL algorithm very likely develops a strategy that achieves the desired goals.

While being highly effective, DRL-based algorithms also have two significant shortcomings when applied to MOTS problems. The first shortcoming of DRL-based approaches is the necessity to integrate multiple and often conflicting objectives into a single reward function. This is mainly the case when the processing of each task is not fixed but instead constitutes a multi-objective optimization problem of its own. Such a function needs to address the multi-optimization problem for the individual tasks and the entire queue, resulting in a complex and difficult-to-define expression.

Moreover, each optimization goal is likely to have its own reward frequency and scale, thus contributing to the difficulty of defining the reward function. The following discussion provides an example for the following scenario: A necessity to screen a set of files for possibly containing malware while minimizing the average processing time for each scanned file. This challenge is further complicated by the fact that the analysis of each file represents a multi-objective optimization problem, with multiple detectors that can be used, each having its own capabilities and resource usage.

The second challenge associated with applying a typical DRL-based solution to MOTS problems is that there is no easy way to ensure that samples are processed identically regardless of the queue state. This issue arises due to the necessity to define a single reward function that models all constraints and priorities; Integrating bounds and constraints into a complex function is far from being trivial. For example, let's consider a DRL-based system tasked with detecting malware in a queue of incoming files: the two (conflicting) goals set for the system are high detection rates (namely, the accuracy of operation) and low average processing times. When such a system becomes backlogged over time (i.e., the average processing time increases rapidly), the DRL-agent may begin conducting a less extensive analysis of files (i.e., compromising the detection rate) to close the gap and reduce the processing times. A scenario where an item is processed differently based on the queue's current state is unacceptable in many domains, including medical testing and safety maintenance checks.

A more general shortcoming of applying DRL to scheduling problems—one that is shared by all artificial neural network (ANN) architectures and other types of machine learning (ML) algorithms—is that the size of the input used to train the model must be fixed. This requirement means that scheduling policies developed by such algorithms cannot effectively operate on queues larger than the ones on which they were trained on. This limitation can potentially lead to significantly sub-optimal solutions, as the algorithm can only process a part of the queue at each given time. To (partially) address this problem, DRL-based scheduling algorithms are often trained on large queue sizes—sometimes much larger than normally used. While this course of action improves the algorithm's performance, it also requires considerably larger architectures, training data, and training time.

The invention introduces a master-slave structure for scheduling queue items (the system of the invention is also referred to herein as MERLIN—which is an arbitrarily selected name). The master-slave system 100 of the invention has a hierarchical DRL-based structure designed for multiple objective scheduling. The system addresses all the abovementioned drawbacks of the prior-art DRL-based approaches, particularly by applying a two-part solution. In the first step, the proposed approach defines a hierarchy of DRL agents. Instead of attempting to solve the MOTS problem in its entirety using a single ANN architecture, the invention divides the problem into two parts: a) devising a policy for the processing of individual items in the queue (by the slave unit 110-2), and; b) devising a policy for managing the queue by the master unit 110-1. This approach makes it possible to accurately define the policy for processing specific items while also ensuring that each item is processed identically regardless of its location in the queue 122. Also, using a modular solution results in a smaller architecture that is significantly easier to train than a single large architecture.

The invention also provides a novel approach that enables a DRL-based scheduling system to manage queues larger than those on which they were trained. The approach of the invention is easy to implement and compatible with most DRL-based approaches. Moreover, the inventive structure enables efficient processing of dynamic queue sizes, i.e., queues where new items are stochastically added over time (see FIG. 4). The prior art never addressed the management of dynamic queues.

The system of the present invention was evaluated on a large-scale malware detection dataset. The overall goal was to obtain the shortest average wait time in the queue. In another aspect, the goal was to enable a cost-effective analysis of the dataset's files: maintaining high detection rates while minimizing the average time an item spends in the queue (a common evaluation metric for queue scheduling algorithms). The domain was challenging as it requires balancing both detection accuracy and the entire queue's processing time. The evaluation results showed that the inventive system outperformed other practical and realistic baselines used to evaluate the same use-case by at-least 22% across multiple queue sizes.

The invention provides: (1) a multi-objective scheduling framework that utilizes a multi-tier DRL solution. This approach: (1) simplifies the training process while enabling defining various constraints; (2) provides a DRL-based solution for scheduling with no prior data both on the processed item and stochastic processing times, i.e., high uncertainty; (3) provides a hierarchical modeling approach that enables the processing of varying queue sizes without the need of retraining the algorithm. The invention was evaluated on a large real-world use-case (malware detection) that demonstrates the scheduling framework's effectiveness and usefulness.

Scheduling is the process of efficiently allocating resources to available tasks; for example, in a production line, task scheduling can be used to minimize the production (processing) time and maximize efficiency.

The choice of a scheduling algorithm has a major impact on the productivity of a process. For this reason, the selection and implementation of the scheduling algorithm should consider the different prerequisites and requirements of the environment. Some of the key factors that affect the selection of the scheduling algorithm include whether scheduling is defined before or during the execution and the ability to interrupt (i.e., pause) a process and replace the currently executed task it executes. The latter process, which enables rotation between unfinished tasks, is called preemption.

Scheduling algorithms may have different (and sometimes conflicting) objectives such as: minimizing waiting time; minimizing average task completion time; minimizing latency or response time; or maximizing the quality of the task output (e.g., service provided to a customer, accuracy in detecting malicious files).

The field of MOTS-related solutions is diverse both in its techniques and the domains in which it is applied. For example, in the field of operations management, M. Köksalan and A. B. Keha, "Using genetic algorithms for single-machine bicriteria scheduling problems," *European Journal of Operational Research*, vol. 145, no. 3, pp. 543-556, 2003, developed a heuristic approach based on a genetic algorithm for the bi-objective scheduling on a single machine problem of minimizing flow time (i.e., total processing time) and the number of tardy (i.e., a measure of a delay in execution) jobs. In the semiconductor manufacturing domain, A. K. Gupta and A. I. Sivakumar, "Single machine scheduling with multiple objectives in semiconductor manufacturing," *The International Journal of Advanced Manufacturing Technology*, vol. 26, no. 9-10, pp. 950-958, 2005, addressed the problem of scheduling n independent jobs on a single testing machine with due dates and sequence-dependent setup times.

Two factors that make the task of scheduling significantly more difficult are: a) the existence of partial or no information about the processed items, and; b) lack of information about the usage cost and efficacy of the various resources at the disposal. For example: a medical testing facility that can employ multiple types of tests to examine a disease. The patient arrives without any preliminary information (age, existing conditions, etc.), and no information exists regarding the cost and/or effectiveness of each test. Under these constraints, the inventors needed to formulate a scheduling strategy.

DRL has proven itself an efficient scheduling technique. In the computing memory-control domain, DRL was used for resource allocation. When referring to changes in the state-action space, only a few solutions have been proposed since DRL-based algorithms tend to strongly rely on a fixed state-action space. Y. Heffetz, R. Vainshtein, G. Katz, and L. Rokach, "Deepline: Automl tool for pipelines generation using deep reinforcement learning and hierarchical actions filtering" CoRR, vol. abs/1911.00061, 2019 showed an approach for dynamic actions modeling that enables a DRL agent to model a varying number of actions using a fixed-size representation. They devised a hierarchical representation of the actions space, where each level of the hierarchy is split into equal-sized clusters of the actions. The agent then iterates over each level's clusters, selecting one action per cluster, and the chosen actions are passed to the next level of the hierarchy, which is then also clustered. The process was iterated until a desired fixed-size action representation was reached. The inventors adopted this approach to evaluate a specific problem of dynamic states.

The DRL problem-setting consists of an environment and an agent. The agent takes actions that affect the environment and change its state. Each action (or sequence of actions) incurs a reward that provides feedback to the agent on the quality of its decisions. Agents can optimize their behavior by interacting with the environment and devising a policy that will yield maximal rewards overall. At every time-step t, the agent selects an action $a_t$ from the action space $A=\{a_1, a_2, \ldots, a_k\}$ that modifies the state of the environment and incurs a reward $r_t$ (positive or negative). The goal of the agent is to maximize future accumulated reward $R_t = \Sigma_t^T r_t$ where T is the index of the final time-step.

A common approach for selecting the action to be taken at each state is the action-value function Q(s, a), also known as the Q-function. The function approximates the expected returns should we take action a at state s. While techniques are varied, DRL algorithms that use Q-functions aim to discover (or closely approximate) the optimal action-value function Q* which is defined as $Q^*(s, a) = \max_\pi E[R_t | s_t = s, a_t = a, \pi]$ where π is the policy mapping states to actions. Since estimating Q for every possible state-action combination is highly impractical, it is common to use an approximator $Q(s, a; \theta) \approx Q^*(s, a)$ where θ represents the parameters of the approximator. The deep reinforcement learning (DRL) algorithm performs this approximation using neural nets, with θ being the parameters of the network.

While DRL has proven very effective in optimizing a single objective, to date, the prior art has failed to apply this approach to multi-objective scheduling successfully. The failure is likely due to the difficulty of balancing multiple, and often contradicting, objectives in a single reward function. When multiple goals affect the reward function, it is more difficult to isolate each action's effect on each of the objectives. Moreover, there is an inherent difficulty in integrating objectives with different value scales and distributions that are provided at different intervals.

The present invention approach partitions the original problem into separate "sub-problems", each being solved with its own DRL-agent. Such partitioning simplifies each individual problem, enables modularity, and reduces the overall optimization and process's complexity. It is important to note that each sub-problem does not address all the goals of the original problem, but instead solves a subset of the goals. The invention's approach defines additional (intermediary) goals to facilitate the desired outcome for each sub-problem. Such a use of an intermediary goal is presented in a use-case experiment described hereinafter.

The present invention approach is modular since it enables easy replacement of each of the individual DRL-agents used to solve the sub-problems. This trait is advantageous from a practical standpoint since it enabled the inventors to recalibrate their model (e.g., change some of the priorities to increase accuracy for a cost of lower throughput, without retraining all of its components.

Examples

The system of the invention consists of a modular and hierarchical DRL architecture. While experimenting with the invention, The inventor began by setting all of the problem domains' constraints and priorities, both for each item in the queue (e.g., the desired detection rate for defects) and for the queue overall (e.g., average processing time). The inventors defined these priorities by $R^i$ and $R^o$, respectively. The inventors then trained one DRL agent—the "internal (slave) agent", to create the internal policy $p^i$ that optimally addressed $R^i$. Finally, the inventors "froze" $p^i$ and use a second DRL agent—the "outer (master) agent"—to train the outer policy $p^o$, whose goal was to optimize $R_T^o$ by scheduling the order by which $p^i$ is applied to the items in T. The inputs for $p^o$ are both the current state of the queue and the outputs of the internal-agent.

It is essential to indicate that the inventors first set the internal policy and only then trained to optimize the outer policy. The inventive approach ensured that all queue items are processed identically regardless of their position in the queue. This trait, which cannot be guaranteed in DRL architectures that use a single reward function for the entire problem, ensures consistency in performance and equal treatment of all items in the queue regardless of their position in the queue. These guarantees are critical in many fields, including medical testing and airplane maintenance.

To simplify our representation, the inventors presented a problem formulation for a two-tier (two-stage) hierarchical model. The proposed representation can easily be expanded to include additional tiers.

Let $T=\{t_1, \ldots, t_n\}$ be a queue of n items. Let $R_j^i$ be the internal reward function, which defines the reward (positive or negative) obtained when processing item $t_j$. Let $R_T^o$ be the outer reward function, which defines the reward for processing the entire queue. The inventors began by optimizing the loss function of the internal (slave) agent, thus setting the policy of the internal agent defined by $\theta_i$:

$$\underset{\theta_i}{\operatorname{argmax}} \sum_{n=1}^{|T|} \mathcal{L}_i(T_n, R^i, \theta_i)$$

where $T_n$ is the nth item in T and $\mathcal{L}_i$ is the loss function of the internal agent.

Once the inventors have set the policy of the internal agent $\theta_i$ they could define the policy of the outer agent. The goal was to minimize the loss function and optimize the policy of the outer agent $\theta_o$:

$$\underset{\theta_o}{\operatorname{argmax}} \mathcal{L}_o(T, R^o, \theta_o \mid \theta_i)$$

where $\mathcal{L}_o$ is the loss function of the outer agent.

The experimental architecture consisted of an outer agent whose goal was to schedule the various items in the queue and an internal agent whose goal was to determine how each item is processed (see FIG. 2). As mentioned, each agent was trained separately: the internal agent was trained first, until convergence. Then, the outer agent was trained by interacting with the internal agent, i.e., exploring various scheduling strategies that involve the fully-trained internal model. The internal agent was "frozen" while the outer agent was trained, ensuring both modularity and that the internal agent's desired performance, which was defined during its training, is maintained.

The roles of the two agents (units) of the invention are very different: The goal of the internal (slave) agent $p^i$ was to create an optimal policy for a single item in the queue. As a result, the state of the internal agent $s^i$ represents the current state of a single item i. The goal of the outer agent $p^o$ was to serve as the scheduling mechanism for the queue. Therefore, the state representation of the outer agent $s^o$ is a combination of all current item representation $S^o = \{s_1^i, s_2^i, \ldots, s_n^i\}$, with the addition (to each item state $s_j^i$) of a single value d indicating whether the processing of the item has ended. FIG. 3 provides an example for a state representation of the outer agent. Each row represents an item, and each column represents an action taken by the internal agent on that item. Non-negative cell values are the outputs of executed actions.

FIG. 3 shows an example of a state matrix with n items that was used. The inner item representation included k values. d indicated whether the processing of the item has ended. $v_k$ was the kth value in the inner item representation.

At each step, the outer (master) agent selects a queue item which is conveyed to the internal agent for processing. As a result, the size of the outer agent's action space is equal to the queue's size. The internal agent's size is determined by the number of processes it can apply on an item (columns in FIG. 3), with additional actions for the final classification d (that may span one or more bits).

The outer agent's scheduling is preemptive. This means that once an item has been submitted to $p^i$, the internal agent only performs a single action rather than analyze the item until completion. $p^o$ can then choose to send a different item to $p^i$, leaving the previous item to be further processed at a later time. The rationale for using this approach is simple: since each action was taken by $p^i$ reveals additional information on the item, $p^o$ has a chance to weigh the benefit of continuing to process the current item against processing another. The internal agent $p^i$ is also preemptive in the sense that it can issue a final decision about the analyzed item without having to run all possible tests or processes on it. This configuration enables the internal agent to strike the desired balance between performance (e.g., classification accuracy) and the resources allocated to achieving it.

The DRL-based master-slave system of the invention is significantly advantageous over existing solutions when dealing with high uncertainty degrees. The inventive system can address the most challenging scenarios, where no preliminary information exists on any of the analyzed items and the costs/outcomes of each action stochastic with unknown distribution. Unlike other commonly-used approaches, the inventive system requires no preliminary information on the processed items-file size, file type, bounds on running time, etc. It also adapts its policy by interacting with the items over time. The ability to operate under high uncertainty is shared both by $p^i$ and $p^o$. $p^i$ interacts with individual items and devises its own policy for processing them. $p^o$ interacts both with items of the queue and with $p^i$, without any prior knowledge on either of them. The approach performs well under such circumstances while even outperforming baselines with access to additional information (i.e., an uneven playing field).

In the use-case example (malware detection), the uncertainty presents itself in two ways: first, the internal agent has no way of knowing in advance the output provided by each detector. Also, each detector's runtime varies from file to file, thus adding another level of complexity to the malware detection process. Secondly, the outer agent has to contend with uncertainty regarding the internal agent's actions and running time as it selects the next files to be processed by the internal agent.

One significant shortcoming of DRL-based solutions to queue management is the network's inability to adapt to changes in the state or action space. The inventors referred to the fact that the network's input, and consequently its number of actions, must be of a fixed size. This inflexibility leads to two types of problems. First, this could easily lead to sub-optimal solutions, with easy-to-process items having to wait until the first X items are done. An example of this scenario was presented in H. Mao, M. Alizadeh, I. Menache, and S. Kandula, "Resource management with deep reinforcement learning," Proceedings of the 15th ACM Workshop on Hot Topics in Networks. 1 em plus 0.5 em minus 0.4 em ACM, 2016, pp. 50-56: since the value of X was 100, the X+1 item could not be considered until the first X items were completed. Secondly, this inability to infer the learned logic to larger queue sizes forced practitioners to train their DRL-agents on relatively larger state representations. This fact led to longer running times and difficulties for the deep network to reach convergence.

The invention provides a novel hierarchical approach for dynamic queue size scheduling that addresses the above challenges. Given a queue T, the inventors partition it into fixed-size subsets of size n, where n was also the number of queue items the outer agent $p^o$ is configured to receive as input. This partitioning results in $$\frac{|T|}{n}$$

sub-queues. To ensure that all sub-queues are exactly of size n, the inventors used padding when needed. The padding consisted of flagged items as "completed" (i.e., no further processing is needed), which effectively ensured that the fully-trained DRL-agent ignored them.

Figure 5:
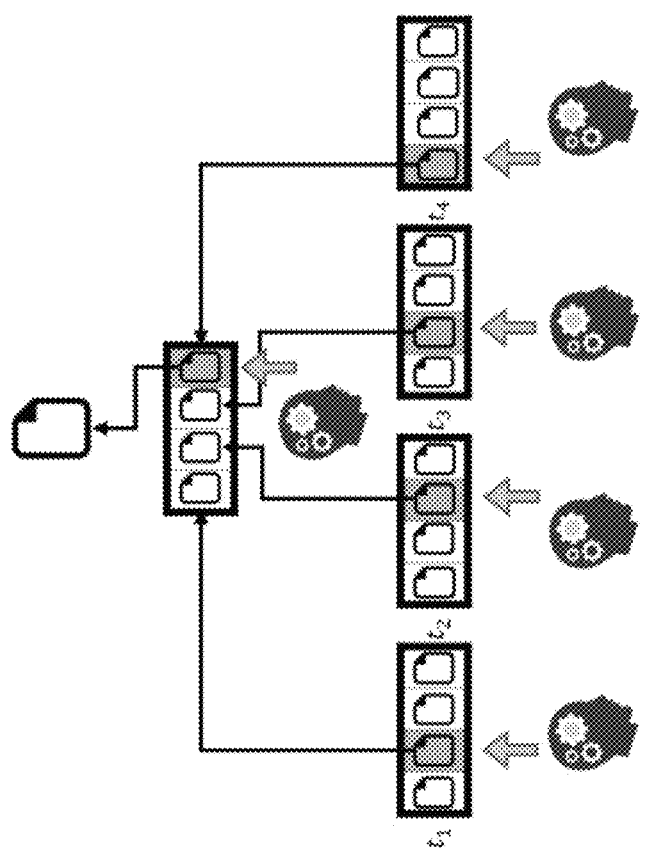
FIG. 5 illustrates an example of a two-stage hierarchical state-action reduction process, with trained DRL algorithm on queue with a length of 4.

Once the partitioning into sub-queues was complete, the inventors applied the outer agent $p^o$ on each sub-queue. This resulted in the creation of a selected set of queue-items whose size denoted as |T'|. Next, the inventors checked to whether T'≤n. If that was the case, T was provided as input to $p^o$ and the scheduling process continued. Otherwise, if T'>n, the inventors once again partitioned the set to $$\frac{|T'|}{n},$$

and continued to do so iteratively until reaching an item set of size n. An illustration of this process is shown in FIG. 5. FIG. 5 illustrates an example of a two-stage hierarchical state-action reduction process with a trained DRL algorithm on queue with a length of 4.

The hierarchical approach of the invention has two significant advantages. First, it enables using a DRL algorithm with a fixed-size input representation for processing queues of practically any size, thus removing one of the main limitations to applying DRL to queue management. Moreover, the item processing looks at all items on the queue—no item is ignored. Secondly, the hierarchical approach makes it possible to train networks with smaller input sizes to process large queues. As a result, smaller networks have to be trained with fewer parameters, leading to faster convergence and less computing resources. The results of the evaluation are provided below.

The experiment was based on a study in Y. Birman, S. Hindi, G. Katz, and A. Shabtai, "Aspire: automated security policy implementation using reinforcement learning," CoRR, vol. abs/1905.10517, 2019 (filed as PCT/IL2020/050527), where a DRL-based framework was used to perform cost-aware analysis of malware files. The study's underlying insight was that while organizations often deploy an ensemble of detectors to ensure high detection rates, in many cases, a subset of the available detectors can produce the correct classification using far fewer computing resources and shorter execution times. Birman et al. created a reward function that factors in the correctness of the classification and the time needed to reach the decision and show that their approach can significantly reduce the time needed to classify a file (by ~80%), only marginally harming detection accuracy. Birman et al. is designed for the cost-effective classification of individual files and not managing queues. The experiment used the DRL agent developed in Birman et al. as the internal agent and then trained the outer agent.

The internal agent: The internal DRL-agent goal was to create a cost-effective policy for the analysis of files for possible malware. To achieve this goal, the agent performed the following steps: 1) send a file to one detector; 2) receive the classification output of the detector (a value in the range [0,1]; 3) based on the available information, determine whether to provide a final classification to the file, thus terminating the process, or query an additional detector(s). If the latter option is chosen, all steps are repeated. The reward functions evaluated in Birman et al. are presented in FIG. 6. All functions define the costs of making a mistake (i.e., false-positive or false-negative) as a function of the time spent classifying the file. The logic behind this approach is novel: discourage the DRL-agent from querying detectors that are unlikely to provide useful information, as they will only lead to more damage in the case of a mistake. The reward for correct classifications is either fixed or a function of the time spent. The former option encourages the algorithm to be more cost-oriented, resulting in shorter processing times per file. The latter approach yields superior performance but saves only a small amount of computing resources. In the current experiment, the inventors chose to use the reward function of experiment #3, which offered (in their view) a relatively reasonable cost/effective solution (savings of about 80% in running time while reducing performance by only 0.5%). This is the policy used in all their other experiments.

A vector containing a single entry for each of the available malware detectors represents the internal agent's state space. Each cell's value is either (−1)—meaning that the detector was not yet queried, or containing the detector's output, a value in the range [0-1].

The internal agent's action space is similarly simple: it contains one action for each detector, and choosing this action will query the corresponding detector to classify the file. Additionally, there are two more actions: 1) classify the file as benign, and; 2) classify the file as malware. Choosing one of these two actions terminates the analysis of the file.

The outer agent was configured to schedule the processing of the files that are analyzed by the internal agent. The outer agent's goal was to minimize the average time that a file spends in the queue while waiting to be classified.

The state-space of the outer agent was modeled using a matrix like the one presented in FIG. 3. Each row in the matrix represented a single file in the queue, and it consisted of the respective file's state, as the internal agent represented it. The state-space of the outer agents is, in fact, a concatenation of the internal agent's state representation for all files. The action space of the outer agent is equal to the initial number of files in the queue. Choosing action $A_i$ indicated that the $i^{th}$ file is sent to the internal agent for processing.

It is important to note that the outer agent interacted with the internal agent as a black-box model. The outer agent had no information regarding the internal agent's inner workings or decision-making process. The outer agent developed its own policy by merely interacting with the internal agent and inferring its own optimal policy. This setting was both simple and more robust, as it enabled modular training and possible replacement of either the internal or outer agents.

Let $T=\{t_1, \ldots, t_n\}$ be a queue of n items. Let $R_{t_i}^I$ be the reward for $t_i$ received from the internal agent. Let $F_{t_i}$ be the number of files not yet been processed, i.e., the number of files that have not marked as completed, at the moment of the last received feedback from the internal agent regarding the file $t_1$. The reward function of the outer agent is shown in Equation 1.

$$R_T^o = \Sigma_{i=1}^n R_{t_i}^I \times F_{t_i} \qquad (1)$$

The goal was to encourage the outer agent to prioritize low processing time files over longer ones, based on the internal agent's feedback in each step.

In the experiments, the inventors used the VMware ESXi operating system within the servers, each with two processing units (CPU). The server included 32 cores, 512 GB of RAM, and 100 TB of SSD disk space. The outer agent's process ran on a virtual machine (VM) with the Ubuntu 18.04 LTS operation system. The virtual machine had 16 CPU cores, 16 GB of RAM, and 10 TB of SSD storage. The agent used a management service that allowed both the training and execution of the DRL algorithm, using different tuning parameters.

According to the specified specification provided in Birman et al, the internal agent process ran on three VMs with Ubuntu 18.04 LTS operation system. Each machine had 4 CPUs, 16 GB RAM configuration with an additional 100 GB of SSD storage. Upon the arrival of files for analysis, the agent stored them in a logical queue at a dedicated storage space, which was also accessible to the internal agent. Both agents used external storage to all logging information in an indexing engine for search and analysis capabilities.

The dataset: The inventors evaluated MERLIN on the dataset presented in Birman et al., which consisted of 25,000 executable files, half malicious and half benign. The inventors obtained both the dataset and the reported running time of each detector for each file, which enabled them to train a DRL agent that accurately replicates the results reported in Birman et al. The inventors then used this architecture as their internal agent.

The inventors trained their outer agent $p^o$ to optimize the scheduling process of all files. The average job completion time metric was used to both train the outer agent and evaluate the overall performance. Let N be the number of files in the queue, $PT_{t_i}$ the total processing time of $t_i$ in the internal agent, and $WT_{t_i}$ the waiting time of $q_i$ in the queue. The completion time for the item $t_i$ in the queue is $C_{t_i}=PT_{t_i}+WT_{t_i}$. The average completion time is calculated, as shown in Equation (2). In essence, this metric was used to measure the average processing time for each file in the queue.

$$averagecompletiontime = \frac{\sum_{i=1}^{N} C_{t_i}}{N} \qquad (2)$$

It is important to stress again that the experimental setting contained a high degree of uncertainty. The experiments used no prior information about the analyzed files (not even their size, used by some of the prior art baselines). All available information on a given file was obtained solely through its processing (i.e., sending it to the internal agent). Additionally, the inventors trained MERLIN on a queue-size of 10 items. By doing so, the inventors demonstrated the model's ability to easily scale for larger queues, sometimes several orders of magnitude larger, despite the high uncertainty of the dataset.

The inventors used the following settings throughout the evaluation. The train/test split was 90%/10%, with the same setting used in all the experiments. An actor-critic DRL architecture used, with experience replay. The outer agent was trained for 34 epochs, which required 22 hours. The framework was implemented on OpenAI Gym, using python version 3.6. Both DRL agents—$p^i$ and $p^o$—used an actor-critic architecture with a single hidden layer of size 20. The hidden and output layers used ReLU and Softmax functions, respectively. The inventors used a replay buffer of size 10, which was activated after 1000 episodes. The inventors used a learning rate of $7e^{-5}$, an exponential decay rate of 0.99 and a fuzz factor (epsilon) of $1e^{-2}$. The inventors also used RMSprop optimization. All experiments were trained until convergence. Penalties have also been used to discourage the agent from taking illegal actions (i.e., selecting already classified files).

The inventors compared MERLIN to both "naive" solutions and well-known scheduling algorithms. All of the chosen baselines were known to function well in high levels of uncertainty. Additionally, all baselines were able to seamlessly operate both on different queue-sizes and on dynamic queues where additional items arrive stochastically.

It is important to note that all baselines "competed" against the outer agent $p^o$, i.e., they all selected the order of the files to be sent to $p^i$. This selection was made for two reasons: First, these baselines are scheduling algorithms, and therefore cannot classify processes of individual files. Secondly, by the use of the same internal agent for all algorithms, the inventors ensured that the performance in terms of accurate classification is uniform. Therefore, the inventors could evaluate the various algorithms based on their running times. The inventors stress this point again, as it is crucial to the correct understanding of the evaluation: possible use of different internal agents or allowing the internal agent to change its policy throughout the evaluation could have lead to different detection rates and thus make the comparison between the algorithms impossible.

Because of the high uncertainty in the problem definition (i.e., no prior information existed on the analyzed files), several commonly-used scheduling approaches could not be used in the experiments. To overcome this limitation, the inventors defined two groups of baselines: a "realistic" group in which the baseline algorithms have access to the same information as in the present approach, and an "unrealistic" group in which the baselines had access to additional data that is not available to MERLIN. The evaluation showed that MERLIN outperformed both groups (except for the baseline, which serves as an optimal lower bound).

"Realistic" Baselines: This group consisted of four baselines, all with access to the same information as MERLIN. Two baselines in this group (SFF and LFF) also used the sizes of the analyzed files. MERLIN did not use this information, but since this information could be easily obtained, the inventors included these baselines in the current group.

First Come First Serve (FCFS): A naive scheduling algorithm that scheduled tasks according to their initial position in the queue]. In the present experiments, once a file reached the top of the queue, it was processed by the internal agent until a classification decision was reached (i.e., "malware" or "benign").

Smallest File First (SFF): A variant of the shortest job first (SJF) approach. Assuming that a smaller file is likely to require less time to classify, the algorithm sorted the files in the queue based on their size, in ascending order. The files were then sequentially processed until completion. The inventors also tested an inverted version of this scheduler: the longest file first (LFF) algorithm.

Multi-Level Feedback Queue (MLFQ): A priority queue-based algorithm that allocated items to multiple sub-queues based on their required resources. In the experiments, the inventors used three sub-queues that partitioned the items based on the running time of the next detector assigned to them by the internal agent $p^i$ (i.e., the time of the next action to be performed on the file). Once the detector was applied to the file, $p^i$ determined (but didn't execute) the next detector that needed to be used. Based on the running time of that detector, the file was then assigned to the appropriate sub-queue. In the case where the next action was the final classification, the item was removed from the queue.

"Unrealistic" Baselines: Each baseline in this group had access to information that is either unavailable to MERLIN (e.g., knowledge on general processing times distributions) or "oracular" (knowledge of specific running times in advance). For each baseline, the inventors specified the specific information available to it.

Shortest Expected Processing Time (SEPT): This baseline implemented a stochastic scheduling approach. Since approaches of this type require knowledge about the distribution of the population's overall processing time, the inventors extracted this information from the training set before running the scheduling algorithm.

Correlation Based Processing Time (CBPT): This baseline assumed that the inventors had advanced knowledge of the classification results (i.e., confidence score) of one malware detector for all files. Based on these scores, the inventors sorted the files in the queue according to their likelihood of being benign. Since benign files usually require less analysis than malicious ones, since the internal agent usually processes them more quickly, this is a high-performing baseline. For this task, the inventors chose the detector with the highest Pearson correlation between its confidence scores and the true item labels.

It is important to note that the inventors treated the confidence scores used for the item-ranking as prior knowledge, meaning that the internal agent may have called the detector that produced the classifications as part of its analysis. Despite its relatively high performance, the inventors considered this baseline as unrealistic since applying even a single detector in advance to all the items in large queue sizes could have led to very poor performance due to the long time it would have taken to produce a classification.

Shortest Processing Time (SPT): The files were ordered in ascending order, based on their total classification time. In other words, the inventors have perfected information on the time needed to classify each file. This baseline guaranteed achievement of best performance.

Longest Processing Time (LPT): The files were ordered in descending order, based on their total classification time. This baseline was guaranteed to achieve the worst performance.

The evaluation did not include a state of the art solutions for large scale malware detection. The commonly used solutions malware detection products are secured file gateways that incorporate network anomaly detectors, rule-based network prevention systems, Anti Viruses, Content Disarm, and Reconstruction and watermarking features. Some examples for this type of file gateways include: OPSWAT-MetaDefender, Sasa and Votiro. These services cannot be consumed without their installation in the on-premise environment. Installation and support costs are very high. There are no open-source or free products for the on-premise environment to which the present solution could be compared. The inventive technique can be integrated and improve such systems' performance thanks to the use of the DRL algorithm in such a way that it does not depend on the secured gateway system and allows learning its behavior, thus maximizing the performance of the system.

We conducted three types of experiments, each with an increasing degree of complexity. We began by evaluating MERLIN on the queue size on which it was trained (10 items). Then, we evaluated our approach's ability to perform on larger queue sizes. Finally, we evaluated a dynamic queue where new items are being stochastically added.

Experiment 1: Fixed Queue Size: This evaluation was conducted on |T|=10, which is also the input size of the used DRL-agent. To ensure the results' validity, the inventors randomly sampled 10 files from the test-set and provided them to all evaluated algorithms. This process was repeated 2,500 times, with the presented results being the average performance across all runs.

Figure 7:
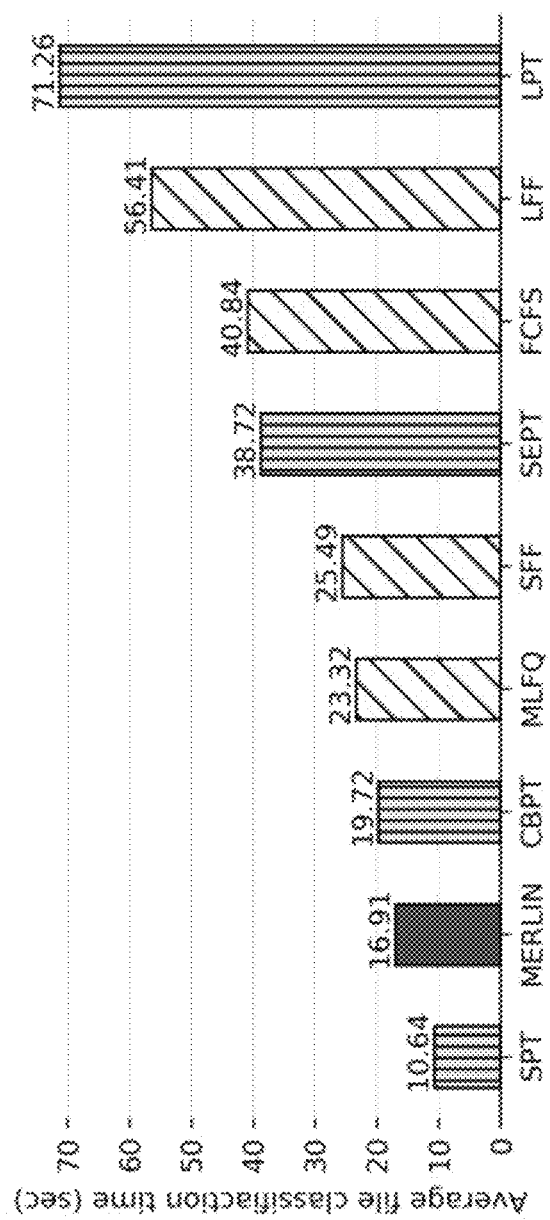
FIG. 7 shows an average completion time comparison in a 10-items queue.

FIG. 7 shows an average completion time comparison in a 10-items queue (diagonal stripe: "realistic" baselines; vertical stripe: "unrealistic" baselines).

The results of the experiment, as presented in FIG. 7, clearly show that the invention's technique outperforms all the evaluated baselines (except for the SPT, which is the optimal scenario). When compared to "realistic" baselines (diagonal stripe columns in FIG. 7), the average job completion time was shorter by 27%-71%. When compared to "unrealistic" baselines (vertical stripe columns), the average job completion time was shorter by 14%-57%.

The analysis indicates that the reason for MERLIN's superior performance is its ability to handle uncertainty better. Since both the outer and internal agents needed to address uncertainty (albeit at different aspects of the challenge), the outer agent's ability to infer the internal agent's policy and behavioral patterns enables it to create its own complementary policy. The interaction between the two DRL-agents is particularly evident in their dealings with difficult-to-classify files, files that the internal agent would not classify with applying multiple detectors. The outer agent identifies these time-consuming files early on (usually after the first detector's confidence score is produced) and immediately pushed such files to the back of the queue to finish with the "easier" files first.

Experiment 2—Large Queue Size: The inventors next evaluated MERLIN's ability to perform well on varying queue sizes. The inventors ran the same experimental setup as used in Experiment 1, however, with queue sizes ranging from 10 to 100. For each queue size, the inventors generated 1,250 random queues used by all algorithms for evaluation. The MERLIN architecture that was used in all the experiments was trained in a queue size of 10.

Figure 8:
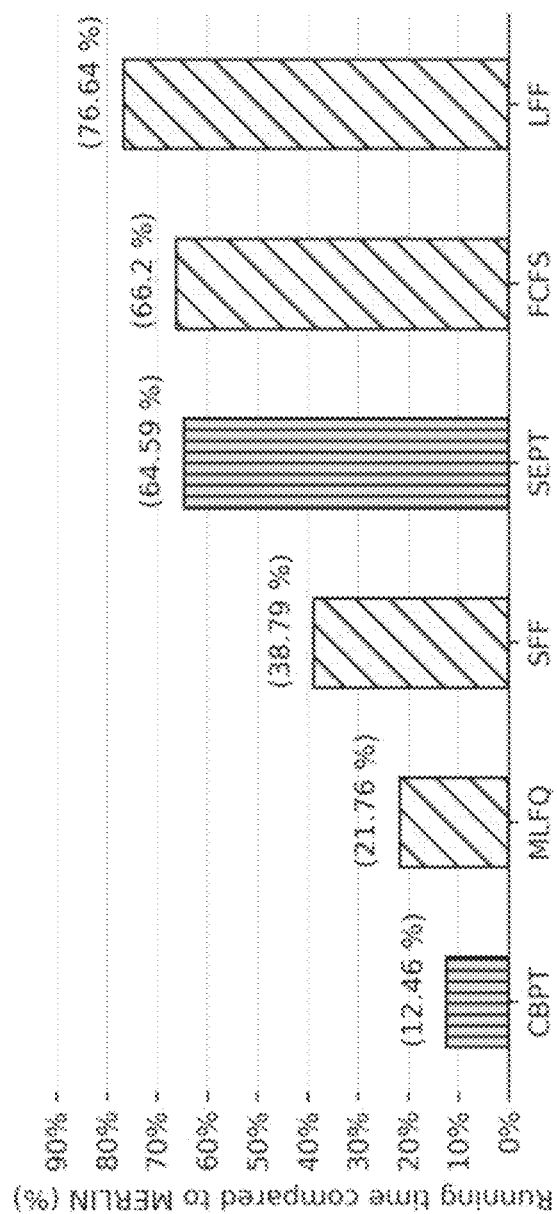
FIG. 8 shows the evaluation of second experimental results comparing the invention against prior art systems.

The results of the evaluation are presented in FIG. 8. MERLIN once again outperforms all the baselines across all the queue sizes. The percentage of improvement in performance over the realistic baselines is 22%-76%, while the improvement over the unrealistic baselines is 13%-64%. The results clearly show that the invention's hierarchical approach to modeling large queues is very effective in enabling DRL-based solutions to scale large queue sizes.

Experiment 3: Dynamic Queues with Stochastic Arrivals: In most real-world scenarios, queues are dynamic, with new items being added at various time intervals. This is the case, for example, in call centers, manufacturing floors, and (as in the present use-case) organizational firewalls that filter incoming files. This scenario adds another level of complexity to previous experiments because the scheduling algorithms need to predict the number of incoming files and their characteristics.

The inventors evaluated three use-cases (i.e., different scenarios). In the first use-case, the incoming file rate was higher than the average processing time. This means that the backlog grew for all approaches and that their test slowed this growth. In the second use-case, the incoming file rate was equal to the average processing time. In this case, the backlog size was expected to be stable, and the scheduling algorithms should have been evaluated based on the size of the backlog they keep. In the third use-case, the incoming file rate was lower than the average processing time, and the scheduling algorithms should have been evaluated based on their ability to keep the backlog as close as possible to zero.

The time interval for adding new files to the queue was identical for all three use-cases. Through the analysis of our training set, the inventors learned that the average file processing time as $\mu=7.8$ seconds with a standard deviation of $\sigma=1.9$ seconds. Therefore, every 7.8 seconds, the inventors randomly sampled a fixed number of files for each use case: for the first experiment, the number of files was $\mu-\sigma$, for the second use case, the number was $\mu$, and for the third use case, the number was $\mu+\sigma$. The variance in performance between the added file batches stems from the fact that the files of each batch are samples randomly, and therefore their characteristics vary. In each use-case, the inventors sampled 1,000 files in total and recorded the backlog of each analyzed algorithm until the backlog was cleared. The experiments showed that MERLIN significantly outperformed all baselines (except for the optimal baseline, which was used as a bound). In all three scenarios, the backlog kept by the present approach was the smallest, often by a significant margin. These results, once again illustrate the effectiveness of the current approach.

Training Larger DRL architectures: The inventors next experimented with demonstrating the advantages of applying the approach to dynamic queue management, namely, larger queues. The inventors trained two additional MERLIN architectures, where the sizes of the input and output layers of the outer agent were enlarged so that the architecture could analyze queue sizes of 20 and 30, respectively. The internal agent remained unchanged, thus ensured the reliability of the comparison.

The inventors compared the running times of the two new architectures to the original MERLIN architecture. The results showed that to achieve comparable performance to that of the original MERLIN ($|T|=10$), the larger architectures needed to run for significantly extended periods. For example, to reach the same final average processing time as the original MERLIN, the $|T|=20$ version needed to run almost seven times as long. For the $|T|=30$, the inventors were not even able to obtain full convergence with the hardware that was used and had to terminate the experiment. The results are shown in FIG. 9. The table of FIG. 9 shows a comparison of the training time (hr) and the average completion time for a file in the queue (sec) between an original MERLIN architecture (T=10) and two larger architectures trained on T=20/30 respectively.

While some embodiments of the invention have been described by way of illustration, it will be apparent that the invention can be carried into practice with many modifications, variations, and adaptations, and with the use of numerous equivalent or alternative solutions that are within the scope of persons skilled in the art, without departing from the spirit of the invention or exceeding the scope of the claims.

The invention claimed is:
1. A master-slave scheduling system, comprising a master DRL unit and a slave DRL unit, wherein:
   said master DRL unit comprising:
      a queue which is configured to contain a plurality of item-representations, each item-representation comprising a plurality of task-entries, each task entry indicating a status of a task for performance at said slave DRL unit;
      a master policy module in a form of a neural network, said master policy module being pre-trained by a master DRL agent and is configured to select a single item-representation from the entire queue and submit the same to said slave DRL unit;
      said master DRL agent which is configured to (a) train said master policy module; and (b) timely receive an updated item-representation from said slave unit, and update the queue accordingly;
   said slave DRL unit comprising:
      a slave policy module in a form of a neural network which is configured to receive a single item-representation, and based on a plurality of the task entries included in the received item representation, select a single task entry and submit the selected task entry to a slave environment for performance;
      a slave DRL agent which is configured to: (a) train said slave policy module; (b) receive an item-representation from said master DRL unit, and submit the same to said slave policy module; (c) receive an updated item-representation from said slave's envi- ronment, and submit the updated item representation to said master DRL unit; and said slave DRL agent which is configured to receive a task, perform said task, and return a status of the performed task.

2. A master-slave scheduling system according to claim 1, wherein said updated item-representation reflects a new state of the slave's environment.

3. A master-slave scheduling system according to claim 1, wherein said slave DRL unit serves as an environment of said master DRL unit.

4. A master-slave scheduling system according to claim 1, which is configured to handle a queue having a size Q larger by n orders of magnitude than q, where q is the size of a main queue on which the master unit was trained on, the system comprising:

said main queue of the master DRL unit; and an additional stage for each said order of magnitude n beyond an order of 0, where each additional stage in turn comprising $q^n$ sub-queues, each sub-queue having a size of q;

wherein during operation, and starting from a highest-order stage, said master policy module is configured to: (a) starting from a highest order stage, apply its operation sequentially on all sub-queues in the stage to select a single item from each sub-queue and to transfer the selected item to a sub-queue in a lower-order stage; (b) continuing sequentially the selections in all remaining lower order stages by repeating (a), until q selected items are fed into said main queue of the master DRL unit; and (c) continuing the item-representation selection from said main queue of the mater DRL unit, and submitting the selected item representation to the policy module of said slave's DRL unit.

5. A master-slave scheduling system according to claim 1, which is configured to:

initially train said policy module of the slave's DRL unit; upon completion of the training of said slave's DRL unit, freeze the slave DRL unit; and during said freeze of said slave's DRL unit, train said policy module of the master unit, while the slave's DRL unit is frozen.

6. A master-slave scheduling method, the method comprising:

a. providing a master DRL unit and a slave DRL unit, each of said units comprising its own DRL agent, a policy module in a form of neural network, reward function and constraints, and an environment, wherein said slave DRL unit serves as the environment of said master DRL unit;

b. providing a queue at said master DRL unit, and configuring said queue to contain a plurality of item-representations, each item-representation comprising a plurality of task-entries, each task entry indicating a status of a task for performance at said slave DRL unit;

c. configuring the master's policy module to, each time select a single item representation from said queue, and submit the same to said slave's policy module at said slave's DRL unit;

d. configuring the slave's policy module to select a single task entry from each item representation that it receives, and submit the task entry to said slave's environment for performance;

e. configuring said slave's DRL agent to: (a) receive an item-representation from said master DRL unit, and submit the same to said slave's policy module; (b) receive an updated item-representation from the slave's environment, and submit the updated item representation to said master DRL unit;

f. based on said slave's reward function and constraints, activating said slave's DRL agent to train said slave policy module;

g. while keeping said slave's DRL unit in a fixed state, and based on said master's reward function and constraints, activating said master DRL agent to train said master policy module; and h. receiving new item representations into the queue, and operating the scheduling method in an operational mode.

7. A master-slave scheduling method according to claim 6, wherein said updated item-representation reflects a new state of the slave's environment.

8. A master-slave scheduling method according to claim 6, which is adapted to handle a queue having a size Q larger by n orders of magnitude than q, where q is the size of a main queue on which the master DRL unit was trained on, the method comprising:

providing said main queue of the master DRL unit;

providing an additional stage for each said order of magnitude n beyond an order of 0, where each additional stage in turn comprising $q^n$ sub-queues, each sub-queue having a size of q;

during operation, and starting from a highest-order stage, activating said master policy module to: (a) starting from a highest order stage, apply its operation sequentially on all sub-queues in this stage to select a single item from each sub-queue and to transfer the selected item to a sub-queue in a lower-order stage; (b) continuing sequentially the selections in all remaining lower order stages by repeating (a), until q selected items are fed into said main queue of the master DRL unit; and continuing the item-representation selection from said main queue of the mater DRL unit, and submitting the selected item representation to the policy module of said slave's DRL unit.

* * * * *